United States Patent
Katsukura et al.

(10) Patent No.: US 8,339,416 B2
(45) Date of Patent: Dec. 25, 2012

(54) IMAGE CONSTRUCTION APPARATUS AND COMPUTER-READABLE MEDIA

(75) Inventors: Makoto Katsukura, Chiyoda-ku (JP); Masanori Nakata, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 13/395,792

(22) PCT Filed: Apr. 6, 2010

(86) PCT No.: PCT/JP2010/056247
§ 371 (c)(1),
(2), (4) Date: Mar. 13, 2012

(87) PCT Pub. No.: WO2011/033803
PCT Pub. Date: Mar. 24, 2011

(65) Prior Publication Data
US 2012/0176405 A1    Jul. 12, 2012

(30) Foreign Application Priority Data
Sep. 16, 2009    (JP) ................................. 2009-214374

(51) Int. Cl.
*G09G 5/00*    (2006.01)
(52) U.S. Cl. ......... 345/619; 345/168; 345/172; 345/173
(58) Field of Classification Search .................. None
See application file for complete search history.

(56) References Cited

U.S. PATENT DOCUMENTS

| | | | |
|---|---|---|---|
| 6,211,870 B1 * | 4/2001 | Foster | 715/744 |
| 6,278,960 B1 * | 8/2001 | De Groot | 702/188 |
| 6,285,357 B1 | 9/2001 | Kushiro et al. | |
| 6,937,972 B1 | 8/2005 | Van Ee | |
| 2005/0193373 A1 * | 9/2005 | Wannamaker et al. | 717/118 |
| 2009/0157201 A1 * | 6/2009 | Oguri et al. | 700/83 |
| 2012/0041925 A1 * | 2/2012 | Pope et al. | 707/626 |

FOREIGN PATENT DOCUMENTS

| | | |
|---|---|---|
| JP | 2002-055818 A | 2/2002 |
| JP | 2002-534038 A | 10/2002 |
| JP | 3763418 B2 | 4/2006 |
| JP | 2007-140983 A | 6/2007 |

OTHER PUBLICATIONS

International Search Report (PCT/ISA/210) issued on Jul. 13, 2010, by Japanese Patent Office as the International Searching Authority for International Application No. PCT/JP2010/056247.
Written Opinion (PCT/ISA/237) issued on Jul. 13, 2010, by Japanese Patent Office as the International Searching Authority for International Application No. PCT/JP2010/056247.

\* cited by examiner

*Primary Examiner* — Kee M Tung
*Assistant Examiner* — Jwalant Amin
(74) *Attorney, Agent, or Firm* — Buchanan Ingersoll & Rooney PC

(57) ABSTRACT

An image construction apparatus has functions of, based on an instruction from a user, creating a binary-coded program, creating a database, and associating the database with an image part. The use of those functions allows the user to easily construct an image including an image part associated with both the program and the database. Some embodiments enable easy association of information on an apparatus to be operated with image parts constructing an image displayed by a remote control apparatus. Some embodiments are suitable for constructing the screen of the remote control apparatus having a graphical user interface.

5 Claims, 19 Drawing Sheets

IMAGE CONSTRUCTION APPARATUS AND COMPUTER-READABLE MEDIA

RELATED APPLICATIONS

This application is based on Japanese Patent Application No. 2009-214374 filed on Sep. 16, 2009 and incorporating the specification, claims and drawings herein by reference in its entirety.

TECHNICAL FIELD

Embodiments of the present invention relate to an image construction apparatus and computer-readable media, and, more particularly, to an image construction apparatus and computer-readable media for constructing the screen of a remote control apparatus having a graphical user interface.

BACKGROUND ART

Recently, with cost reduction and higher resolution of liquid crystal panels, graphical user interfaces (GUIs) are becoming popular. The use of the GUI which has been used only in personal computers with high performances is spreading among remote control apparatuses for production facilities. The use of the GUI enables to suppress an increase in the number of operation switches which is originated from enhancement of the performance of a remote control apparatus for production facilities. In addition, a user can intuitively input instructions via the GUI.

However, in designing a remote control apparatus having a GUI, a programmer may need to design objects, such as images and icons, to be displayed on the screen, associate a displayed object with information on an apparatus or the like, and set the display contents of the screen for an input from the user. This makes the development cost for a remote control apparatus with a GUI significantly larger than that for a conventional remote control apparatus which is not equipped with a GUI.

Some GUI applications change screens to provide information effective to a user on a narrow screen. Occasionally, when the amount and the types of data, which are shared by different screens of the GUI, increases the process contents of the application becomes complicated, making it difficult to create the application itself.

Accordingly, various techniques which enable easy construction of GUIs have been proposed (see, for example, Patent Literature 1).

CITATION LIST

Patent Literature

Patent Literature 1: Unexamined Japanese Patent Application KOKAI Publication No. 2002-55818

Problem to be Solved

The technique described in Patent Literature 1 separately creates a screen and data transfer procedures at the time of screen transition. Then the screen and the data transfer procedures are associated with each other in order to assign predetermined procedures to elements, such as icons, on the screen, being operated. While this technique can create a screen and data transfer procedures independently, transfer of data most often needs to be considered for each screen transition, thus complicating the development process.

It is therefore an object of the present embodiments to provide an image construction apparatus, etc., which enables easy association of information on an apparatus to be operated with image parts constituting the image of a remote control apparatus without complicating the development process.

Means for Solving the Problem

To achieve the object, there is provided an image construction apparatus for constructing an image to be displayed on a screen of a remote control apparatus operating a plurality of apparatuses constructing a network, comprising an image generation unit that generates the image including an image part indicating information on the apparatuses; a database generation unit that generates a database to be updated based on the information on the apparatuses acquired over the network; an association unit that associates the apparatus information constituting the database with the image part corresponding to the apparatus information; a source code generation unit that generates a source code of a program executing a process assigned to the image part with which the apparatus information is associated; a program generation unit that compiles the source code to generate a binary-coded program; and a writing unit that writes the program into a storage unit provided in the remote control apparatus.

Advantageous Effect

Information on an apparatus to be operated can easily be associated with image parts constructing the image displayed by a remote control apparatus.

DETAILED DESCRIPTION (First Embodiment)

Figure 1:
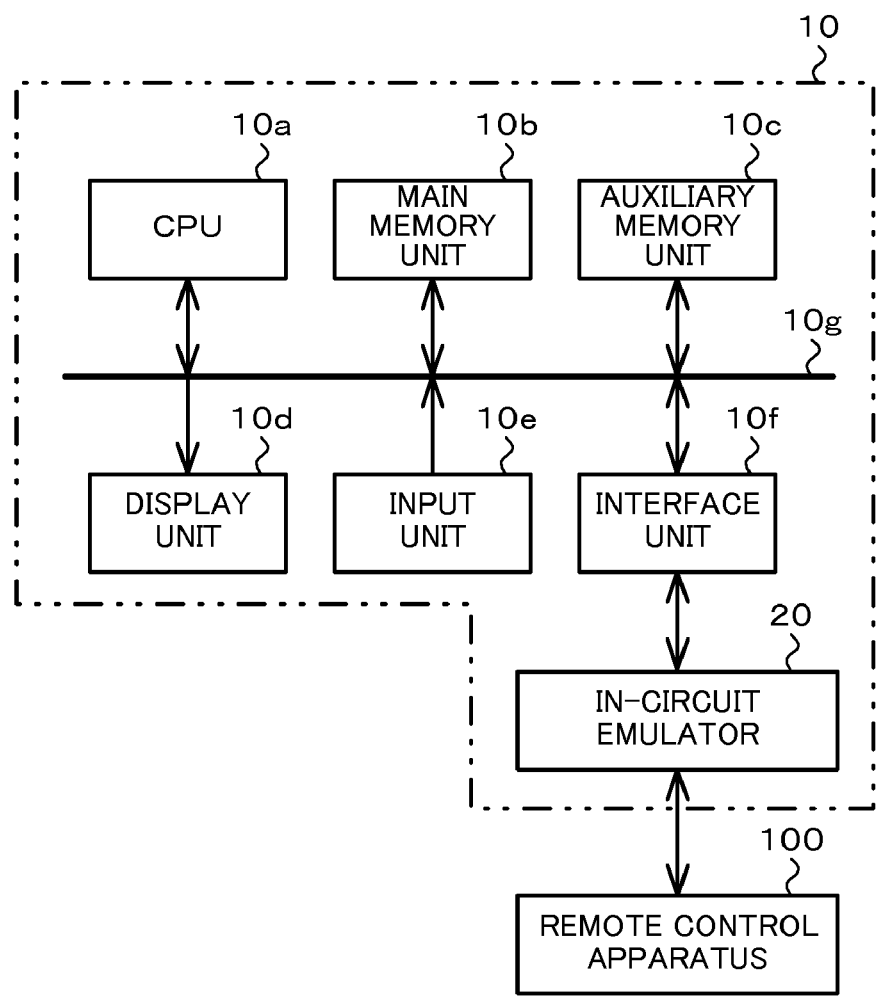
FIG. 1 is a block diagram of an image construction apparatus according to a first embodiment of the invention.

Hereunder, a first embodiment (with various alternate embodiments) of the present invention will be described with reference to FIGS. 1 to 12. FIG. 1 is a block diagram showing an image construction apparatus 10 according to the embodiment together with a remote control apparatus 100. The image construction apparatus 10 25 constructs a screen to be displayed by the remote control apparatus 100 equipped with a liquid crystal panel or the like for displaying the status of an apparatus to be operated. As shown in FIG. 1, the image construction apparatus 10 is configured to include a CPU (Central Processing Unit) 10a, a main memory unit 10b, an auxiliary memory unit 10c, a display unit 10d, an input unit 10e, an interface unit 10f, a system bus 10g which connects the those units to one another, and an in-circuit emulator 20 connected to the interface unit 10f.

The CPU 10a executes a predetermined process to be described later according to a program stored in the auxiliary memory unit 10c.

The main memory unit 10b is configured to include an RAM (Random Access Memory) and/or the like, and is used as a work area for the CPU 10a.

The auxiliary memory unit 10c is configured to include a non-volatile memory, such as an EPROM (Erasable Programmable ROM), a magnetic disk or a semiconductor memory. The auxiliary memory unit 10c stores an image creating program, a compiler, various parameters, and the like, for creating a screen to be displayed on the remote control apparatus 100.

The display unit 10d is configured to include a CRT (Cathode Ray Tube) or an LCD (Liquid Crystal Display) and/or the like, and displays input screens, such as windows W1 to W3 to be described later, the result of processing performed by the CPU 10a, and/or the like.

The input unit 10e is configured to include a pointing device, such as a keyboard or a mouse. An operator's instruction is input via the input unit 10e, and is notified to the CPU 10a via the system bus 10g.

The interface unit 10f is configured to include a USB interface, an LAN (Local Area Network) interface and/or the like. The in-circuit emulator 20 is connected to the system bus 10g via the interface unit 10f.

In one embodiment, the in-circuit emulator 20 has a debugging capability. The remote control apparatus 100 is connected to the in-circuit emulator 20 by a serial cable.

The remote control apparatus 100 transmits an instruction from the user to an air conditioning system via a communication line, such as a metal cable. The remote control apparatus 100 includes an interface (see FIG. 2) which has a liquid crystal display 101 to display information on the operational conditions of the apparatus to be operated, the ambient temperature, and/or the like, and a touch panel 101a disposed over the liquid crystal display 101.

Figure 2:
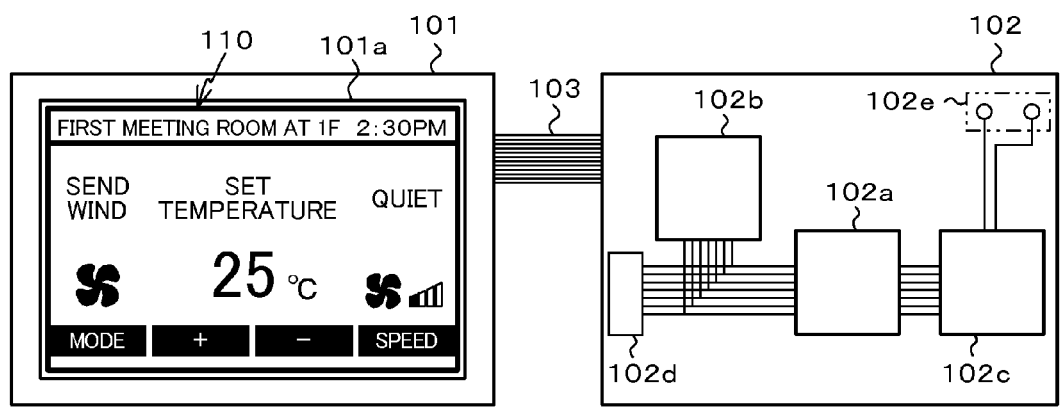
FIG. 2 is a diagram showing a liquid crystal display and a circuit board which constitute a remote control apparatus.

FIG. 2 shows the liquid crystal display 101, the touch panel 101a mounted to cover the liquid crystal display 101, and a circuit board 102 to be housed in the remote control apparatus 100, all constituting the remote control apparatus 100.

Figure 3:
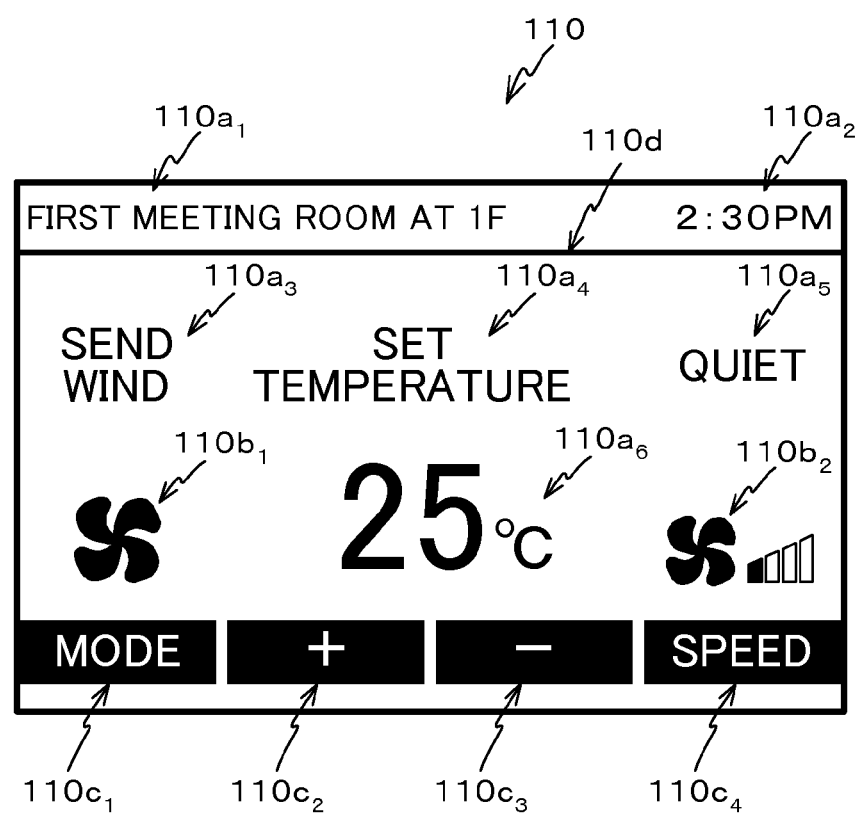
FIG. 3 is a diagram showing one example of an image displayed on the liquid crystal display.

The liquid crystal display 101 uses TFTs (Thin Film Transistors), and displays texts, icons, figures, buttons, and/or the like. As one example, FIG. 3 shows an image 110 to be displayed on the screen of the liquid crystal display 101. As shown in FIG. 3, the liquid crystal display 101 displays, for example, texts 110a indicating the name of the place where the apparatus is located, the time, the set temperature, the mode, the wind speed, and/or the like, icons 110b indicating the setting of the mode of the apparatus and the wind speed, buttons 110c for changing the mode, the set temperature and the wind speed, and a figure image 110d such as a line for improving the visibility of the screen.

Returning to FIG. 2, when the user touches a button 110c, the touch panel 101a detects the touched position, and outputs the detection result.

The circuit board 102 is a rectangular board on which an arithmetic operation circuit 102a, a memory circuit 102b, and an input/output circuit 102c are formed, and further has a connector 102d and a communication terminal 102e mounted thereon. The circuits 102a to 102c, the connector 102d, the communication terminal 102e and the Liquid crystal display 101 are connected to one another by a system bus 103.

The arithmetic operation circuit 102a has a CPU and a volatile memory, such as RAM, which serves as a work area for this CPU. The program stored in the memory circuit 102b is loaded and executed by the arithmetic operation circuit 102a.

The memory circuit 102b has a semiconductor memory, such as EPROM and/or the like, and stores a program for controlling the liquid crystal display 101, a program for processing information output from the touch panel 101a, images to be displayed on the liquid crystal display 101, information relating to image parts (attribute data, database) constituting the images, and/or the like.

Figure 4:
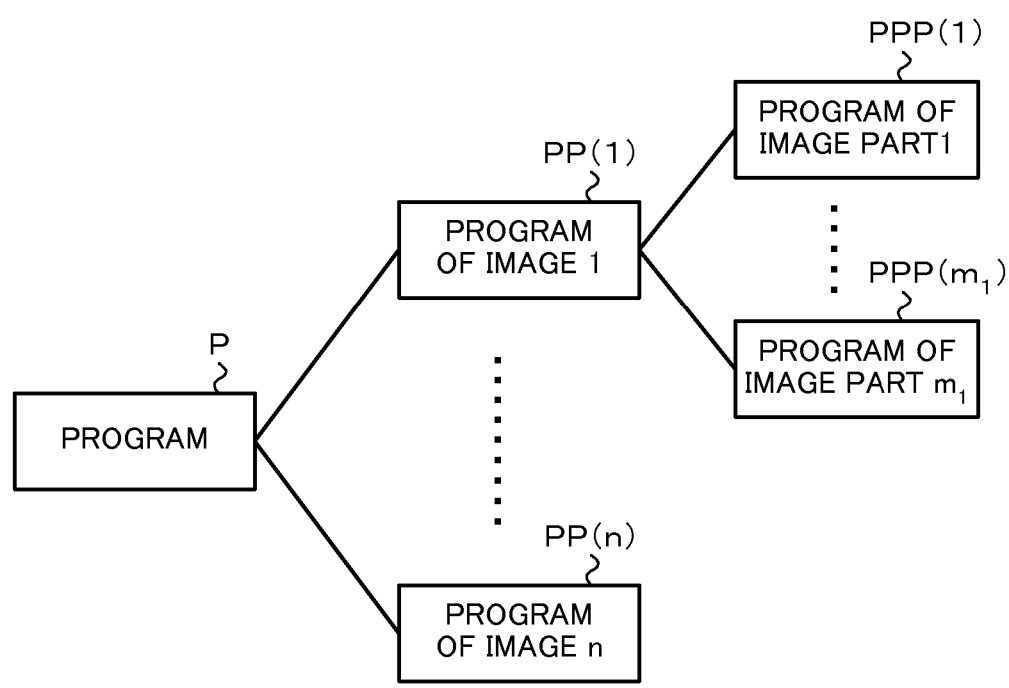
FIG. 4 is a diagram showing a general structure of a program stored in a memory circuit.

FIG. 4 is a diagram showing the structure of a program P stored in the memory circuit 102b. This program P is comprised of programs PP(1) to PP(n) relating to images 1 to n. The program PP(1) is comprised of programs PPP(1) to PPP($m_1$) which are executed when image parts 1 to $m_1$ constituting the image 1 are displayed on the liquid crystal display 101, or are manipulated via the touch panel 101a. Likewise, each program of programs PP(i) (i ranging from 2 to n), though not illustrated, is comprised of programs PPP(1) to PPP($m_1$) relating to image parts 1 to m, constituting the image i.

Each of the image parts 1 to $m_1$ is a part for constructing an image displayed on the screen, such as the text 110a, icon 110b, button 110c, or figure image 110d shown in FIG. 3. Each of the image parts 1 to $m_1$ has attribute data defining the contents of a program which is executed when each of the image parts 1 to $m_1$ is manipulated via the touch panel 101a.

For example, the attribute data includes the name of an image part, information for defining to which one of the images 1 to n the image part belongs, positional information when the image part is displayed on the liquid crystal display 101, information for defining whether the image part is a part to be manipulated like the button 110c, or an image which is used only in display of information like the text 110a, and color information of the image part. This attribute data is created by the image construction apparatus 10, and is uploaded to the memory circuit 102b of the remote control apparatus 100 via the in-circuit emulator 20.

Figure 5:
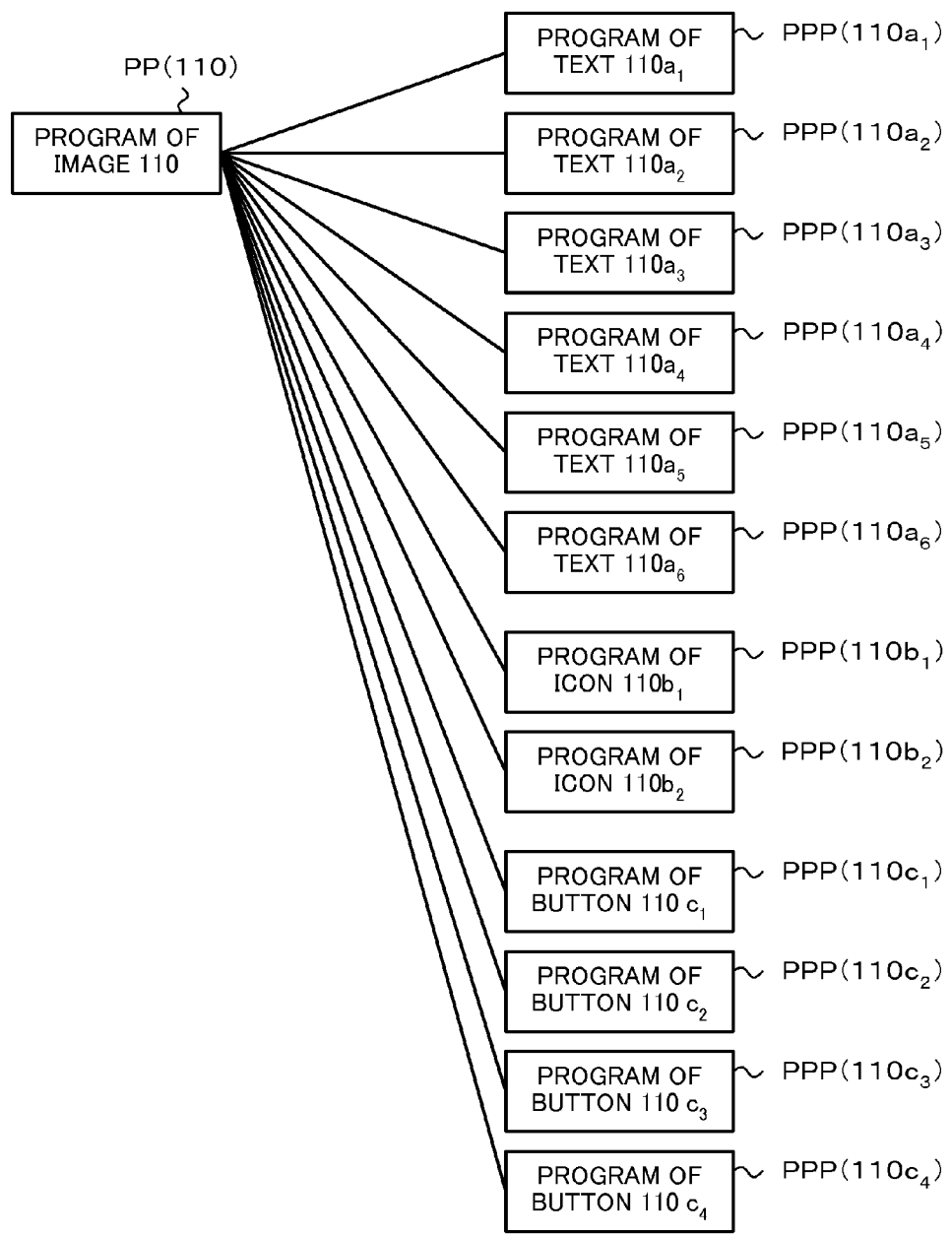
FIG. 5 is a diagram for describing a specific structure of the program in FIG. 4.

FIG. 5 is a diagram specifically illustrating the relation among the program PP(110) relating to the image 110 shown in FIG. 3, programs PPP($110a_1$) to PPP($110a_6$) which are respectively assigned to texts $110a_1$ to $110a_6$ which constitute this image, a program PPP($110b_1$) and a program PPP($110b_2$)

which are respectively assigned to an icons $110b_1$ and $110b_2$, and programs $PPP(110c_1)$ to $PPP(110c_4)$ which are respectively assigned to buttons $110c_1$ to $110c_4$. As shown in FIG. 5, the program PP(110) relating to the image 110 is comprised of the programs $PPP(110a_1)$ to $PPP(110a_6)$, the program $PPP(110b_1)$, the program $PPP(110b_2)$, and the programs PPP $(110c_1)$ to $PPP(110c_4)$.

Figure 6:
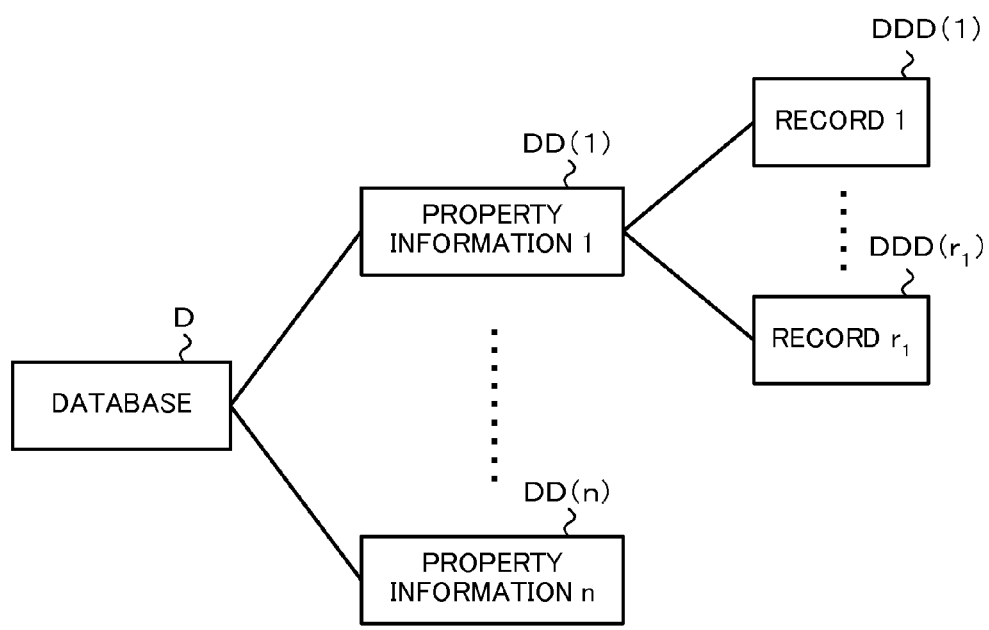
FIG. 6 is a diagram showing a general structure of a database stored in the memory circuit.

FIG. 6 is a diagram showing the structure of a database stored in the memory circuit 102b. This database has a hierarchical structure including records and property information having a set of records.

Property information relates to an air conditioning system network which is created by a plurality of air conditioning systems 1 to n. Specifically, the property information relates to the operational conditions of each of the air conditioning systems creating the air conditioning system network, the room temperature which is the control target of each air conditioning system, and the temperature, the amount of wind, the direction of wind, and/or the like, set in each air conditioning system.

A record is information relating to a single air conditioning system constituting the air conditioning system network. This information, like the property information, relates to the operational conditions of the air conditioning system, the room temperature detected by the air conditioning system, and the temperature, the amount of wind, the direction of wind, and/or the like, set in the air conditioning system. The remote control apparatus 100 acquires data held in each air conditioning system in a given cycle, and updates the records successively. Accordingly, the contents of the records creating the database in the remote control apparatus 100 are updated in synchronism with the update of the data held in the individual air conditioning systems.

In a database D according to the embodiment, as apparent from FIG. 6, a set of records DDD(1) to $DDD(r_1)$ of the individual air conditioning systems create property information DD(1) of the air conditioning system network. As the individual records DDD(1) to $DDD(r_1)$ are successively updated, the contents of the property information DD(1) are updated as needed. Property information DD(i), though not illustrated, is likewise comprised of records DDD(1) to DDD $(r_i)$ (i ranging from 2 to n), and as the individual records DDD(1) to $DDD(r_i)$ are successively updated, the contents of the property information DD(i) are updated as needed.

Figure 7:
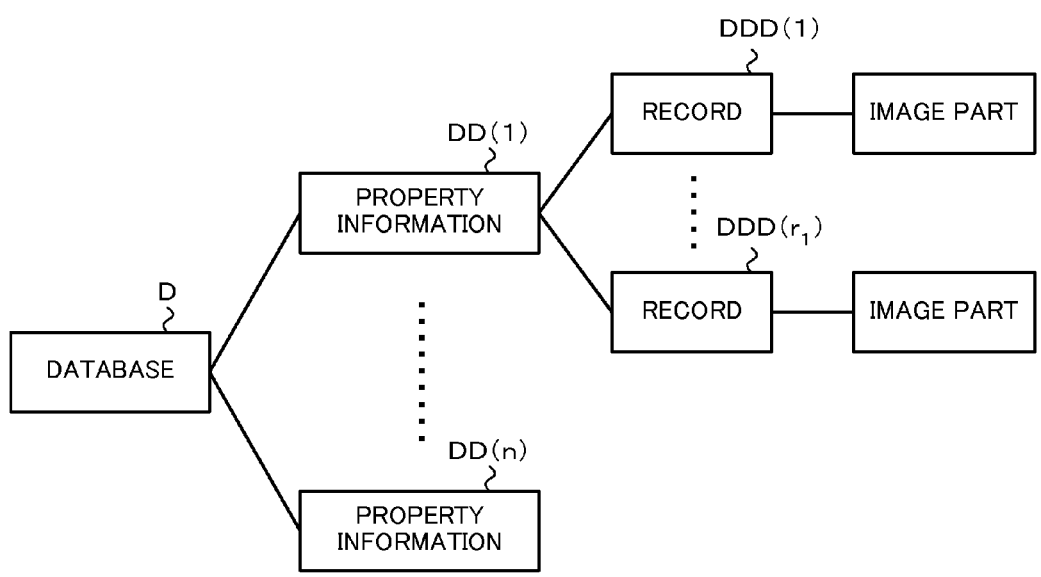
FIG. 7 is a diagram showing the relation between records and image parts.
Figure 8:
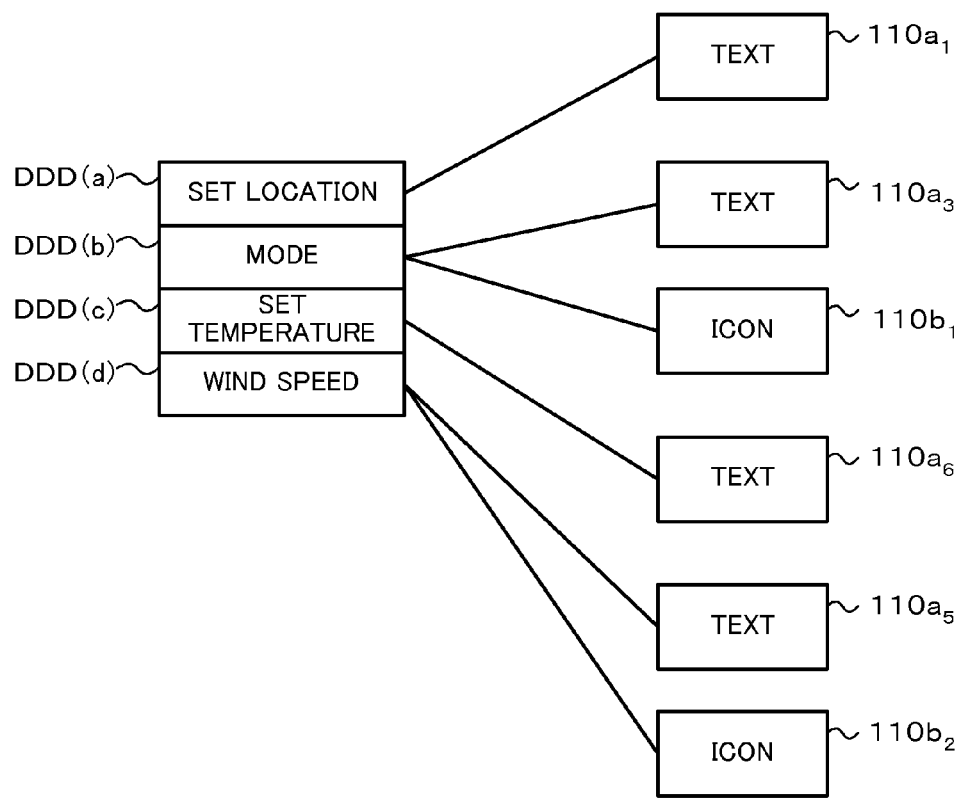
FIG. 8 is a diagram for describing a specific structure of the database in FIG. 7.

FIG. 7 is a diagram showing the relation between the records DDD(1) to $DDD(r_1)$ constituting the database stored in the memory circuit 102b of the remote control apparatus 100 and the image parts. The aforementioned image part is associated with each information constituting each of the records DDD(1) to $DDD(r_1)$. Specifically, as apparent from FIG. 8, the text $110a_1$ constituting the image 110 shown in FIG. 3 is associated with the information relating to the set location of the record DDD. The text $110a_3$ and the icon $110b_1$ are associated with information on the mode. Information relating to the text $110a_6$ is associated with information on the set temperature. The text $110a_5$ and the icon $110b_2$ are associated with information on the wind speed. As a result, the program assigned to the image part is associated with the record DDD. Specifically, as apparent from FIGS. 5 and 8, the program of the text $110a_1$ is associated with a set-location record DDD(a). Further, each of the program of the text $110a_3$ and the program of the icon $110b_1$ is associated with the a mode record DDD(b). The program of the text $110a_6$ is associated with a set-temperature record DDD(c). Further, each of the program of the text $110a_5$ and the program of the icon $110b_2$ is associated with the a wind-speed record DDD(d).

The circuit that is comprised of the aforementioned arithmetic operation circuit 102a, memory circuit 102b and input/output circuit 102c is connected via the communication terminal 102e to the air conditioning system to be operated.

Next, the operational method for the image construction apparatus 10 and the operation of the image construction apparatus 10 will be described. When the image construction apparatus 10 is activated, the CPU 10a reads the image creating program from the auxiliary memory unit 10c, and executes the program. As a result, an image construction window W1 shown in FIG. 9 is displayed on the display unit 10d.

Figure 9:
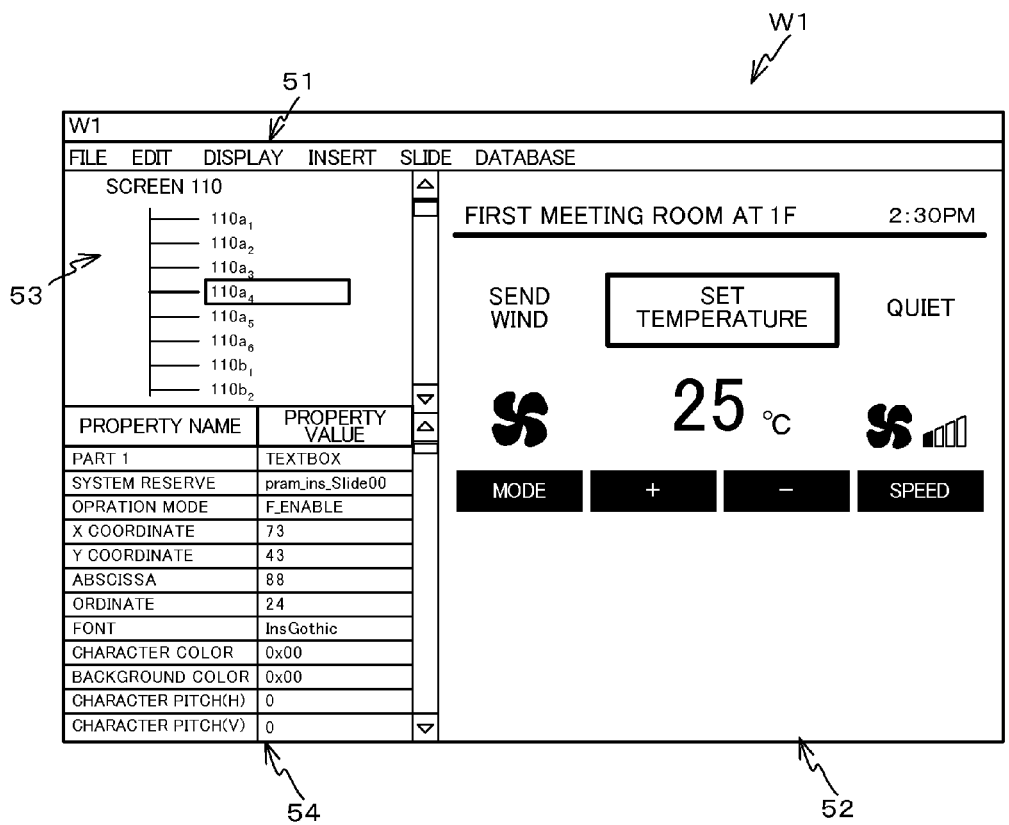
FIG. 9 is a diagram showing an image construction window.

The image construction window W1 shown in FIG. 9 is comprised of a tool bar 51, a work area 52, a tree figure display area 53, and a property display area 54. The user can create a desired image displayed by the remote control apparatus 100 by arranging the image parts, such as the texts $110a_1$ to $110a_6$, the icons $110b_1$, $110b_2$, and the buttons $110c_1$ to $110c_4$ shown in FIG. 3, in the work area 52. The names of the image parts arranged in the work area 52 are displayed in the tree figure display area 53. This tree figure shows the relation between an image and image parts.

When the user selects an image part placed in the work area 52 or the name of an image part displayed in the tree figure display area 53, the attribute data of the selected image part can be written in the property display area 54. The user sequentially selects an image part to write its attribute data, and executes processes assigned to the icons and tags which constitute the tool bar 51. As a result, the source code of a program for executing the process defined by the attribute data of the image part constituting the image is generated. Then, this source code is compiled to generate a binary-coded program. The user can generate a program which is assigned to the each image part by sequentially selecting a desired part image and executing the aforementioned procedures.

Figure 10:
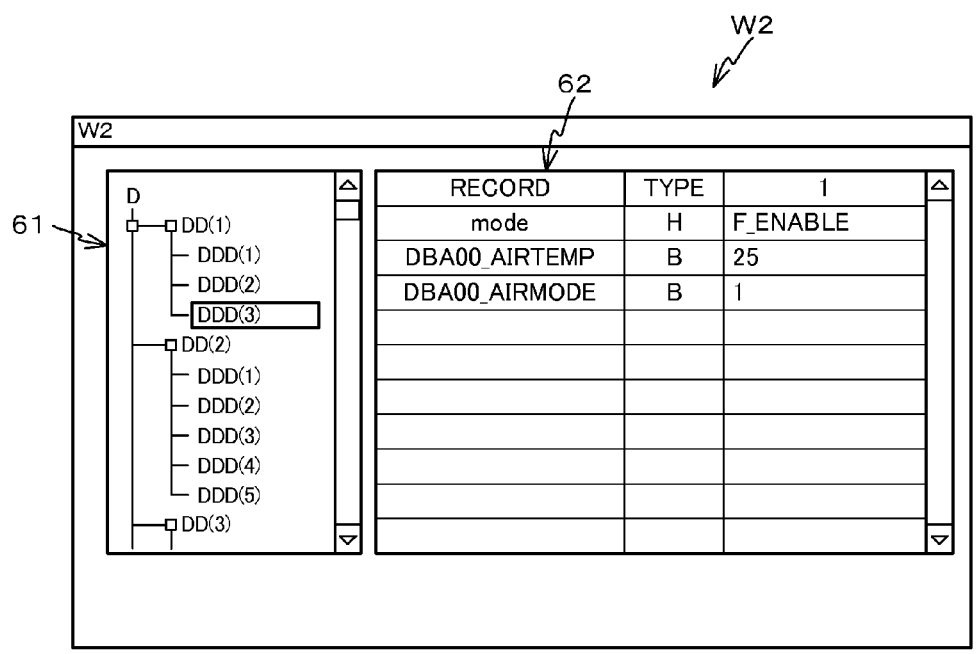
FIG. 10 is a diagram showing a database creation window.

FIG. 10 is a diagram showing a database creation window W2. The database creation window W2 is comprised of a database display area 61 and a database editing area 62. The user displays the database creation window W2 on the display unit 10d, and selects a record item in the database shown in the database display area 61. As a result, the contents of records DDD(1) to $DDD(r_j)$ constituting property information DD(j) (j ranging from 1 to n) can be entered in the database editing area 62. In this state, the user can create a desired database D by entering the contents of the records DDD(1) to $DDD(r_j)$ in the database editing area 62.

Figure 11:
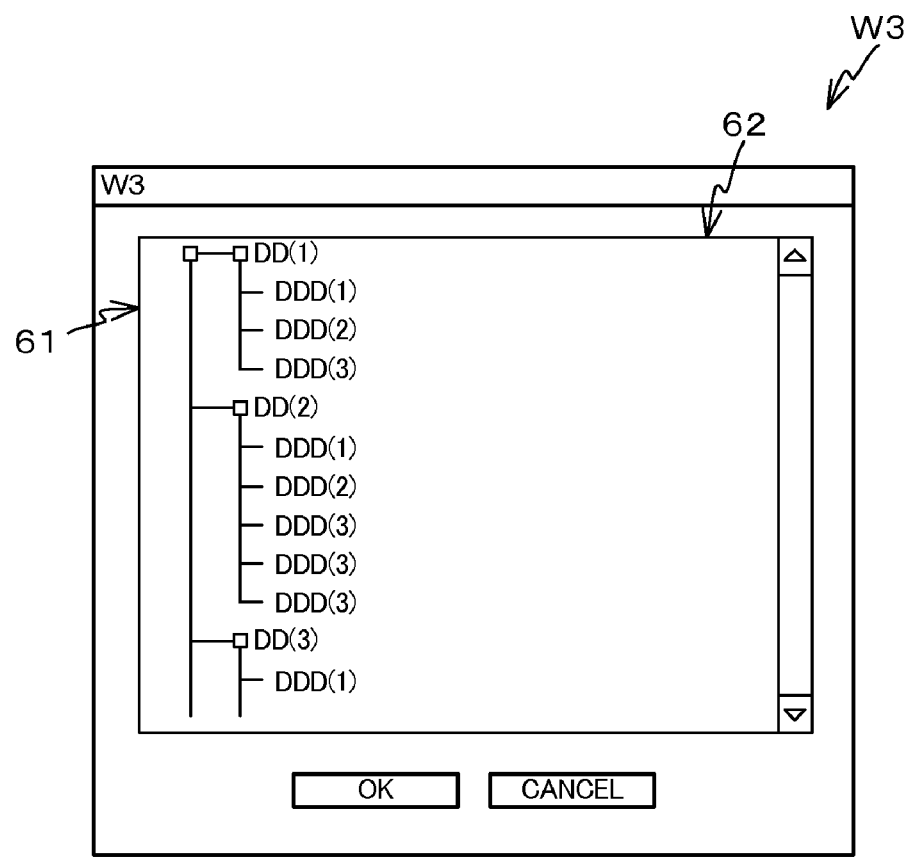
FIG. 11 is a diagram showing an execution window.

FIG. 11 is a diagram showing an execution window W3 for associating an image part with a database. The execution window W3 is an input screen for executing association of records DDD constituting the database D shown in FIG. 7 or FIG. 8 with image parts. For example, the user can associate a record DDD with an image part by displaying the image construction window W1 on the display unit 10d, selecting the desired image part, then displaying the exection window W3, and selecting the desired record DDD.

The user can upload the database D and the binary-coded program P and/or the like which are associated with each other into the memory circuit 102b of the remote control apparatus 100 via the in-circuit emulator 20.

Figure 12:
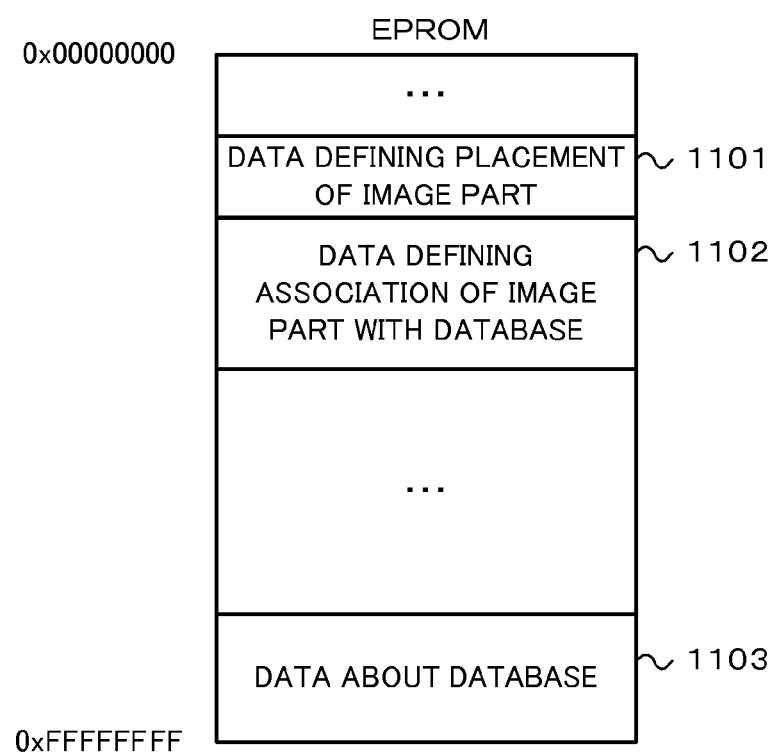
FIG. 12 is a diagram showing data uploaded into the memory circuit.

FIG. 12 is a diagram showing data uploaded into the memory circuit 102b. As shown in FIG. 12, uploaded data 1101 defining the arrangement of an image part, 10 uploaded data 1102 defining the association of the image part with a database, and uploaded data 1103 about the database are stored in the memory circuit 102b. When the remote control apparatus 100 is activated, those data are read out into the CPU of the arithmetic operation circuit 102a as needed, and stored in the RAM and/or the like provided as the work area of the arithmetic operation circuit 102a.

As described above, the image construction apparatus 10 according to the first embodiment has a function of creating a binary-coded program, a function of creating a database, and a function of associating a database with an image part, in accordance with an instruction from the user. Using those functions, the user can easily construct an image comprised of image parts associated with both the program and the database.

Specifically, the user has functionality and diversity of a personalized source-coded program without writing/coding/creating a source-coded program, which is conventionally written by a programmer. Therefore, a user who is not experienced with programming can easily construct an image to be displayed on the liquid crystal display 101 of the remote control apparatus 100.

(Second Embodiment)

Next, a second embodiment (with various alternate embodiments) will be described referring to FIGS. 13 and 14. The descriptions of those components which are similar or equivalent to the components of the first embodiment will be optional or simplified.

Figure 13:
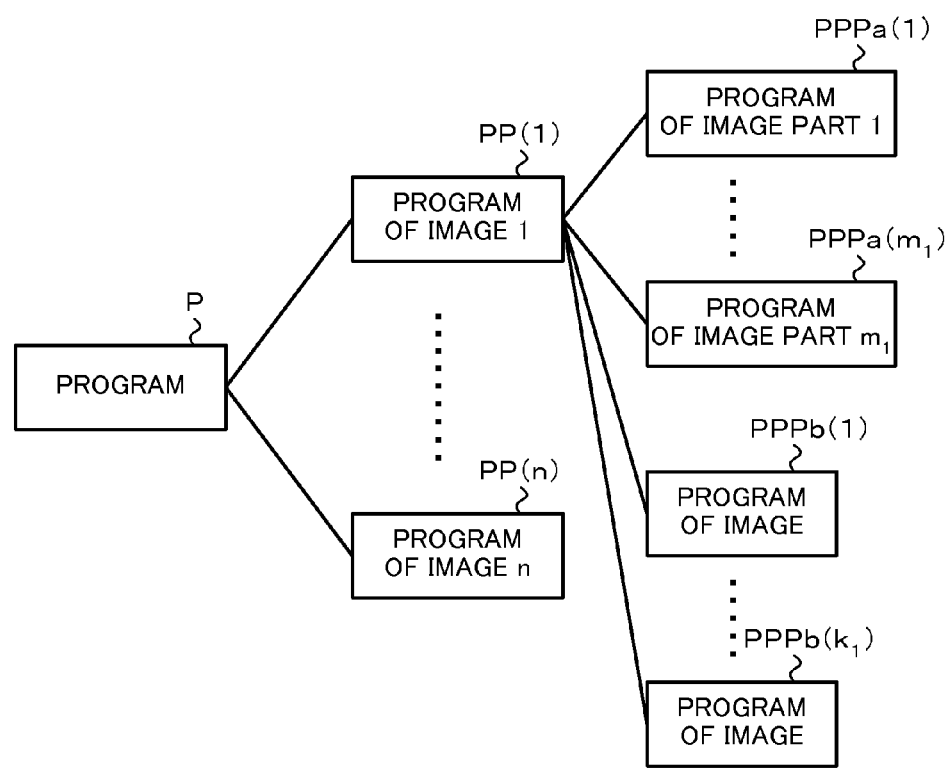
FIG. 13 is a diagram showing a general structure of a program stored in the memory circuit of an image construction apparatus according to a second embodiment of the invention.

In the image construction apparatus 10 according to the second embodiment, as shown in FIG. 13, a program PP(1) assigned to an image 1 includes programs PPPa(1) to PPPa($m_1$) assigned to image parts 1 to $m_1$, and programs PPPb(1) to PPPb($k_1$) directly assigned to the image 1. Though not illustrated, each program of programs PP(i) (i ranging from 2 to n) likewise includes programs PPPa(1) to PPPa($m_i$) assigned to image parts 1 to $m_i$ constituting an image i, and programs PPPb(1) to PPPb($k_i$) directly assigned to the image i. The image construction apparatus 10 according to this embodiment 10 differs from the image construction apparatus 10 according to the first embodiment in those points.

Programs PPPa(1) to PPPa($m_j$) (j ranging from 1 to n) are programs which are each executed when displayed on the liquid crystal display 101 or when operated via the touch panel 101a. When an image part is manipulated, for example, this program 15 highlights or flickers the color of the image part. Programs PPPb(1) to PPPb($k_j$) are programs which, upon manipulation of an image part such as a button, for example, changes the contents of the text of another image part. When an arrow for raising the set temperature is manipulated, for example, those programs PPPb(1) to PPPb($k_j$) change the contents of the text corresponding to the set temperature, for example, from 25° C. to 26° C.

Figure 14:
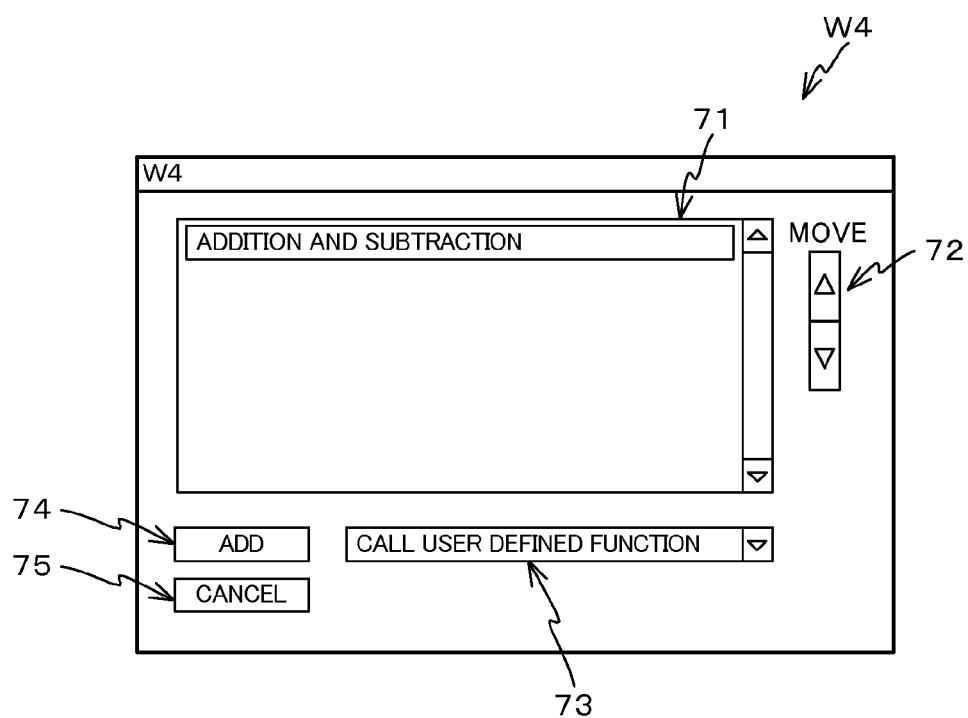
FIG. 14 is a diagram showing an image movement setting window.

An image movement setting window W4 shown in FIG. 14 is comprised of a movement setting area 71, a sequence changing button 72 and a pull-down menu 73. When an image part displayed on the work area 52 of the image construction window W1 shown in FIG. 9 is selected, for example, the image movement setting window W4 is displayed on the display unit 10d. The user can input the content of a movement into the movement setting area 71 of the image movement setting window W4. The input of the movement content can also be made by the user's selecting a desired movement from a plurality of movements listed in a menu appearing by opening the pull-down menu 73 in addition to the user's direct input. When a plurality of movements are input, the user can change the sequence of selected movements by activating the sequence changing button 72. As a result, the image part is assigned with the program (PPPb) and/or the like to change the contents of the text of another image part.

As described above, the image construction apparatus 10 according to the second embodiment has a function of creating a program to change the content of another image part and assigning this program to a prescribed image part. Using this function, the user can easily create a program to change the content of another image part and assign this program to a prescribed image part.

Specifically, the user has functionality and diversity of a personalized source-coded program without writing/coding/creating a source-coded program, which is conventionally written by a programmer. Therefore, a user who is not experienced with programming can create a program to change the content of another image part and assign this program to a prescribed image part.

(Third Embodiment)

Next, a third embodiment (with various alternate embodiments) will be described referring to FIGS. 15 and 16. The descriptions of those components which are similar or equivalent to the components of each of the foregoing embodiments will be optional or simplified.

The image construction apparatus 10 according to the third embodiment of the invention differs from the image construction apparatus 10 according to each of the foregoing embodiments in its capability of setting transition of an image.

Figure 15:
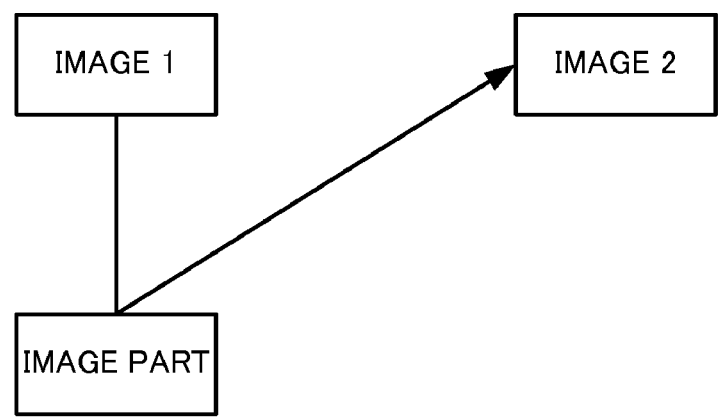
FIG. 15 is a diagram for describing transition of the image of an image construction apparatus according to a third embodiment of the invention.

FIG. 15 is a diagram conceptually illustrating an image transition showing that an image 2 is displayed on the liquid crystal display 101 when an image part constituting an image 1 displayed on the liquid crystal display 101 of the remote control apparatus 100 is manipulated.

Figure 16:
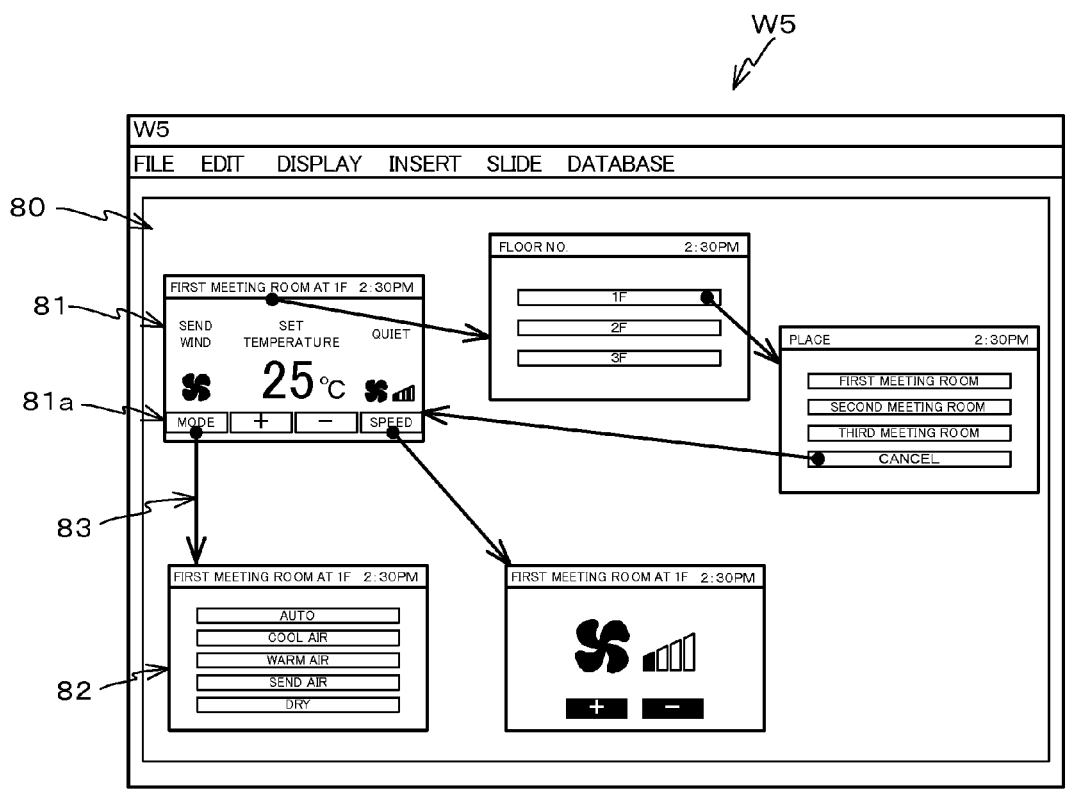
FIG. 16 is a diagram showing a transition setting window.

A plurality of screens are shown in a display area 80 of a transition setting window W5 shown in FIG. 16. In the transition setting window W5, transition of an image is represented by an arrow having an image part constituting one image as a start point and another image as the end point. For example, a transition indicating arrow 83 shows that when an image part 81a constituting an image 81 displayed on the liquid crystal display 101 is manipulated, the image displayed on the liquid crystal display 101 is changed to an image 82.

The user can create a program to define the transition of an image by placing the transition indicating arrow 83 on the transition setting window W5 in such a way that an image part constituting an image at the transition origin becomes the start point and an image at the transition destination becomes an end point. With regard to the placement of the transition indicating arrow 83, first, an image part constituting the image at the transition origin is selected with a pointing device and/or the like , and then the image at the transition destination is selected therewith. Then, a command defined by an icon on the tool bar is executed under this situation to enable the placement of the transition indicating arrow 83. In addition, the user can change an image at the transition destination by selecting the transition indicating arrow 83 already placed, and then selecting an image at the transition destination.

As described above, the image construction apparatus 10 according to the third embodiment has a function of creating a program to define the transition of an image. Using this function, the user can easily create a program to define the transition of an image.

While the related art requires that source codes and/or the like be decoded to confirm the transition of an image, the image construction apparatus 10 according to the third embodiment shows the transition of an image with the transition indicating arrow 83. Thus, a user may visually confirm an image at the transition origin and an image at the transition destination.

(Fourth Embodiment)

Next, a fourth embodiment (with various alternate embodiments) will be described referring to FIGS. 17 to 19. The descriptions of those components which are similar or equivalent to the components of each of the foregoing embodiments will be optional or simplified.

Figure 17:
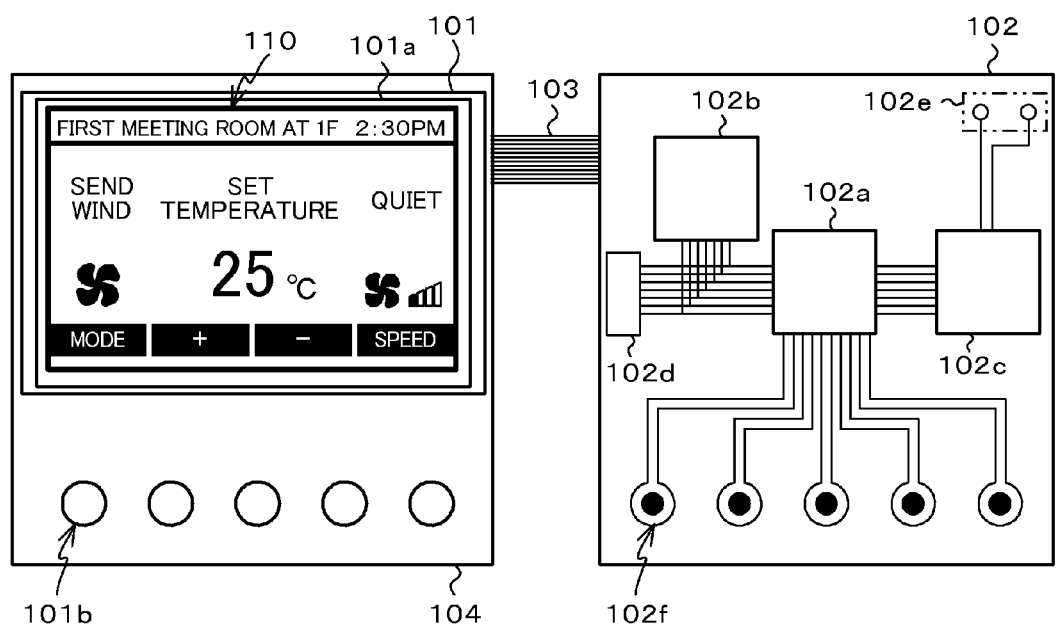
FIG. 17 is a diagram for describing a remote control apparatus according to a fourth embodiment of the invention.

FIG. 17 shows the liquid crystal display 101 constituting the remote control apparatus 100 according to the fourth embodiment, the touch panel 101a attached to cover the liquid crystal display 101, and the circuit board 102 accommodated in the remote control apparatus 100.

As shown in FIG. 17, the remote control apparatus 100 according to the embodiment differs from each of the foregoing embodiments in that an external button 101b is provided on a board 104 on which the liquid crystal display 101 is mounted, and a contact 102f, which operates when the external button 101b is operated, is mounted on the circuit board 102.

The contact 102f is, for example, a normally open contact which is connected to the arithmetic operation circuit 102a via a conductor pattern provided on the circuit board 102. The arithmetic operation circuit 102a can detect the user's operation of the external button 101b via the contact 102f.

Figure 18:
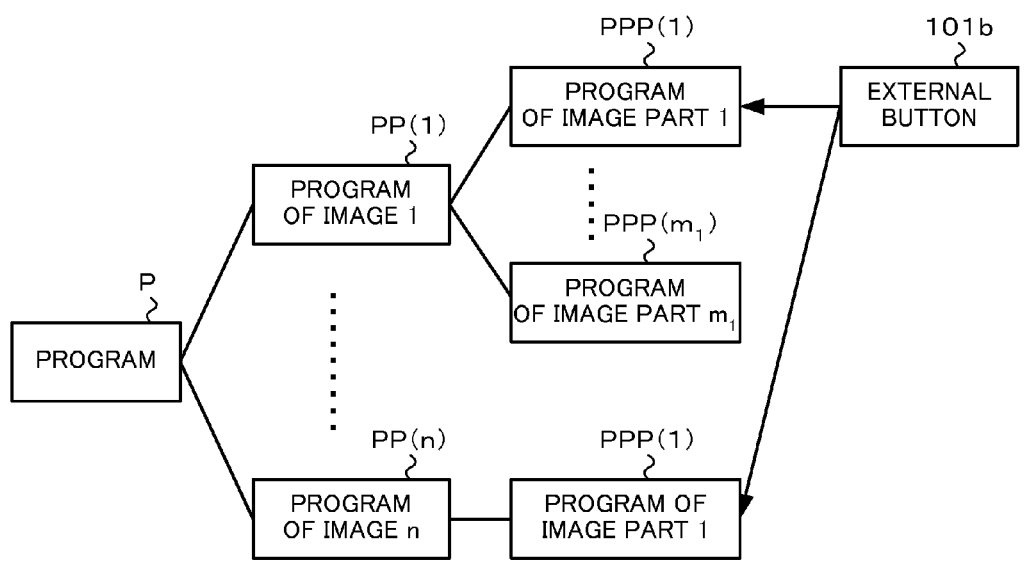
FIG. 18 is a diagram showing the structure of a program stored in a memory circuit.

FIG. 18 is a diagram showing programs PPP constituting a program P and assigned to image parts, and the external button 101b associated with the programs PPP. FIG. 18 shows that when the external button 101b is operated, a program PPP(1) constituting a program PP(1) of an image 1 and assigned to an image part 1, and a program PPP(1) constituting a program PP(n) of an image n and assigned to the image part 1 are executed. In this case, when the external button 101b is operated, a process equivalent to the one performed when operated via the touch panel 101a is performed on the image part 1 of the image 1 and the image part 1 of the image n.

Figure 19A:
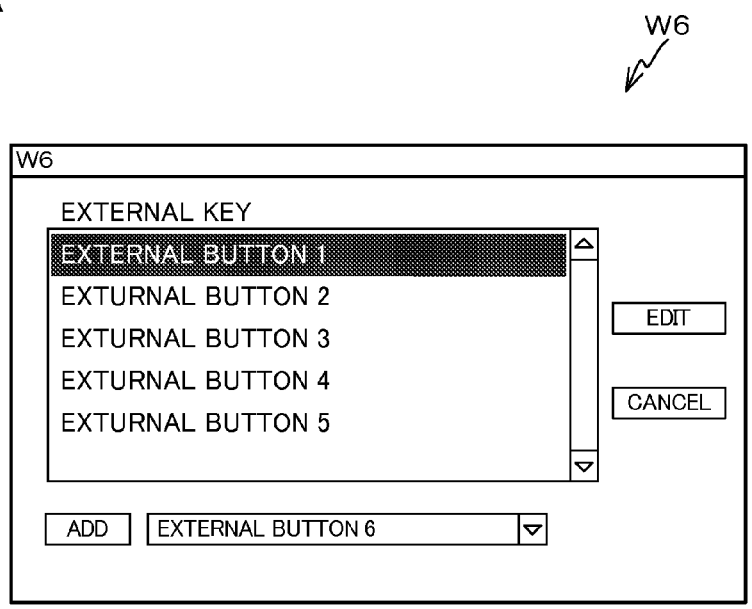
FIG. 19A is a diagram showing an external key setting window.
Figure 19B:
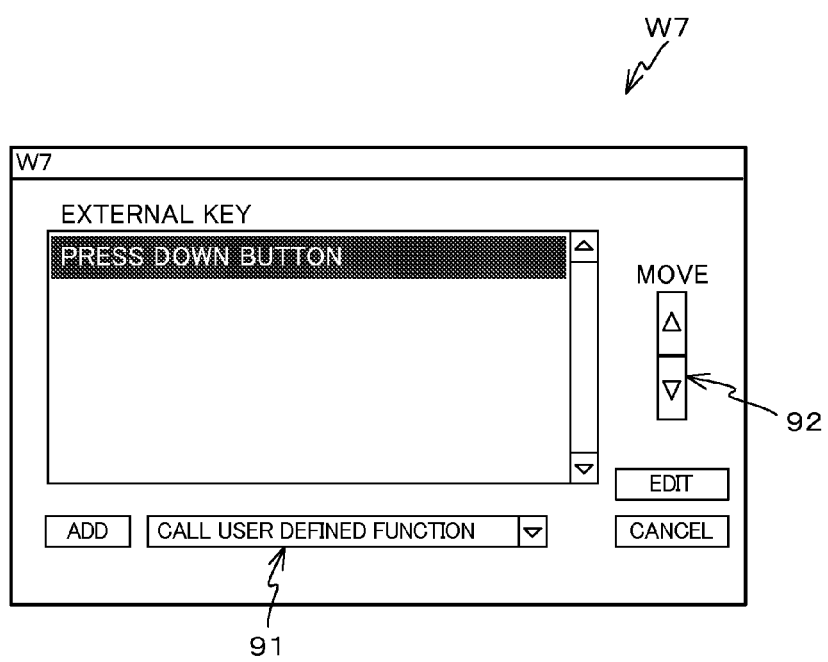
FIG. 19B is a diagram showing a control setting window.

FIG. 19A is a diagram showing an external key setting window W6. FIG. 19B is a diagram showing a control setting window W7. By selecting an external button displayed on the external key setting window W6 and inputting the content of a desired process on the control setting window W7, the user can assign the desired process to the external button selected on the external key setting window W6. The entry of the process content into the control setting window W7 can be made by selecting a desired process from a plurality of processes listed in a menu appearing by opening a pull-down menu 91. When a plurality of movements are input, the user can change the sequence of selected processes by activating a sequence changing button 92. As a result, a program assigned to an image part can be assigned to the external button 101b.

As described above, the image construction apparatus 10 according to the fourth embodiment has a function of assigning a program to an external button provided on the remote control apparatus 100. Using this function, the user can easily assign a program assigned to another image part to the external button too.

Specifically, the user has functionality and diversity of a personalized source-coded program without writing/coding/creating a source-coded program, which is conventionally written by a programmer. Therefore, a user who is not experienced with programming can easily assign a program assigned to another image part to the external button too.

The remote control apparatus 100 according to the fourth embodiment has both the touch panel 101a and the external button 101b. Depending on the functions of the remote control apparatus 100, however, the touch panel 101a is optional.

Although the embodiments of the invention have been described, the invention is not limited to the individual embodiments.

For example, the programs stored in the auxiliary memory unit 10c of the image construction apparatus 10 in each of the above-described embodiments may be stored in a computer readable recording medium, such as a flexible disk, CD-ROM (Compact Disk Read-Only Memory), DVD (Digital Versatile Disk) or MO (Magneto-Optical disk), for its distribution, and may be installed to configure an apparatus which executes the above-described processes.

The programs may be stored in a disk drive unit and/or the like of a predetermined server apparatus on a communication network, such as the Internet, and may be downloaded in the form of a carrier having the programs superimposed thereon.

When the above-described functions are achieved by being shared with the OS (Operating System) or the cooperation of the OS and an application, for example, only those portions which are not achieved by the OS may be stored in a medium for distribution, or downloaded.

Various embodiments and modifications may be made to the invention without departing from the broad spirit and scope of the invention. The above-described embodiments are intended to illustrate the present invention, not to limit the scope of the invention. The scope of the invention is shown by the attached claims rather than the embodiments. Various modifications made within the claims of the invention and within the meaning of an equivalent of the claims are to be regarded to be in the scope of the invention.

This application is based on Japanese Patent Application No. 2009-214374 filed on Sep. 16, 2009 and incorporating the specification, claims and drawings herein by reference in its entirety.

Industrial Applicability

The image construction apparatus and program of the embodiments are suitable for constructing the screen of a remote control apparatus having a graphical user interface.

Description Of Reference Symbols

10 Image construction apparatus
10a CPU
10b Main memory unit
10c Auxiliary memory unit
10d Display unit
10e Input unit
10f Interface unit
10g System bus
20 In-circuit emulator
51 Tool bar
52 Work area
53 Tree figure display area
54 Property display area
61 Database display area
62 Database editing area
71 Movement setting area
72 Sequence changing button
73 Pull-down menu
80 Display area
81 Image
81a Image part
82 Image
83 Transition indicating arrow
91 Pull-down menu
92 Sequence changing button
100 Remote control apparatus
101 Liquid crystal display
101a Touch panel
101b External button
102 Circuit board
102a Arithmetic operation circuit 102b Memory circuit
102c Input/output circuit
102d Connector
102e Communication terminal
102f Contact
103 System bus
104 Board
110 Image
110a Text
110b Icon
110c Button
110d Figure image
W1 Image construction window
W2 Database creation window
W3 Execution window
W4 Image movement setting window
W5 Transition setting window
W6 External key setting window
W7 Control setting window

What is claimed is:

1. An image construction apparatus for constructing an image to be displayed on a screen of a remote control apparatus operating a plurality of apparatuses constructing a network, comprising:
   an image generation unit that generates the image including an image part indicating information on the apparatuses;
   a database generation unit that generates a database to be updated based on the information on the apparatuses acquired over the network;
   an association unit that associates the apparatus information constituting the database with the image part corresponding to the apparatus information;
   a source code generation unit that generates a source code of a program executing a process assigned to the image part with which the apparatus information is associated;
   a program generation unit that compiles the source code to generate a binary-coded program;
   a writing unit that writes the program into a storage unit provided in the remote control apparatus; and
   a display unit that, when an image displayed on the screen is changed over by execution of the program executing the process assigned to the image part, displays the image at a transition origin, the image at a transition destination and the image part.

2. The image construction apparatus according to claim 1, wherein the display unit displays a transitional line connecting the image part and the image of the transition destination.

3. The image construction apparatus according to claim 1, wherein the remote control apparatus includes:
   an interface having an operation switch;
   an assigning unit that assigns a same process as the process assigned to the image part to the operation switch;
   a source code generation unit that generates a source code of a program executing a process when the operation switch is operated;
   a program generation unit that compiles the source code to generate a binary-coded program; and
   a writing unit that writes the program into the storage unit provided in the remote control apparatus.

4. The image construction apparatus according to claim 1, wherein the apparatuses are air conditioning systems.

5. A non-transitory computer-readable medium having computer-readable instructions stored thereon which, as a result of being executed in a computer system having at least one input device, at least one processor and at least one output device, instructs the computer system to allow a control computer for an image construction apparatus to construct an image display by a remote control apparatus operating a plurality of apparatuses constructing a network, comprising:
   generating the image including an image part indicating information on the apparatuses;
   generating a database to be updated based on the information on the apparatuses acquired over the network;
   associating the apparatus information constituting the database with the image part corresponding to the apparatus information;
   generating a source code of a program executing a process assigned to the image part with which the apparatus information is associated;
   compiling the source code to generate a binary-coded program;
   writing the program into a storage unit provided in the remote control apparatus; and
   when the constructed image is changed over by execution of the program executing the process assigned to the image part, displaying the image at a transition origin, the image at a transition destination, and the image part.

* * * * *